United States Patent
Labelle et al.

(10) Patent No.: US 7,240,017 B2
(45) Date of Patent: Jul. 3, 2007

(54) SYSTEM AND METHOD OF DISPENSING INSURANCE THROUGH A COMPUTER NETWORK

(75) Inventors: Guy J Labelle, Flagstaff, AZ (US); George A Howington, Flagstaff, AZ (US); Roman J Ruhnke, Flagstaff, AZ (US); Andrea L Labelle, Flagstaff, AZ (US)

(73) Assignee: International Insurance Group, Inc., Flagstaff, AZ (US)

( * ) Notice: Subject to any disclaimer, the term of this patent is extended or adjusted under 35 U.S.C. 154(b) by 493 days.

(21) Appl. No.: 10/051,645

(22) Filed: Jan. 18, 2002

(65) Prior Publication Data

US 2002/0120476 A1    Aug. 29, 2002

Related U.S. Application Data

(60) Provisional application No. 60/262,534, filed on Jan. 18, 2001.

(51) Int. Cl.
*G06F 19/00* (2006.01)
(52) U.S. Cl. ............................................. 705/4; 705/26
(58) Field of Classification Search .................... 705/4, 705/26
See application file for complete search history.

(56) References Cited

U.S. PATENT DOCUMENTS

| | | | |
|---|---|---|---|
| 4,567,359 A | 1/1986 | Lockwood | 235/381 |
| 4,831,526 A | 5/1989 | Luchs et al. | 705/4 |
| 5,128,859 A * | 7/1992 | Carbone et al. | 705/4 |
| 5,191,522 A | 3/1993 | Bosco et al. | 705/4 |
| 5,446,653 A | 8/1995 | Miller et al. | 705/4 |
| 5,523,942 A | 6/1996 | Tyler et al. | 705/4 |
| 5,537,315 A * | 7/1996 | Mitcham | 705/4 |
| 5,655,085 A | 8/1997 | Ryan et al. | 705/4 |
| 5,809,478 A | 9/1998 | Greco et al. | 705/4 |
| 5,873,066 A | 2/1999 | Underwood et al. | 705/4 |

(Continued)

FOREIGN PATENT DOCUMENTS

JP    07239885 A  *  9/1995

OTHER PUBLICATIONS

Anonymous, information available from the web site of InsureMarket, Apr. 20, 1999, 9 pages.*

(Continued)

*Primary Examiner*—C. Luke Gilligan
*Assistant Examiner*—Dilek B. Cobanoglu
(74) *Attorney, Agent, or Firm*—Snell & Wilmer L.L.P.

(57) ABSTRACT

Systems and methods for facilitating the dispensing of insurance and of an insurance company selling insurance policies are provided, which may be network or Internet based, and may be managed through a general agent. Policy information from insurance companies may be received or stored. Data may be received from customers and insurance rates or quotes provided, which may be from competing companies. An instruction to purchase and payment may be received and proof of coverage, such as printing a document, may be facilitated. Data may be input directly by a customer or by an agent on behalf of the customer. The policy information, customer data, and premiums may be provided to the insurance companies. Insurance agents may advertise, and may refer customers from their own websites in exchange for commissions. The insurance offered for sale may be, automobile or specialty insurance, and may provide coverage in another country.

37 Claims, 3 Drawing Sheets

U.S. PATENT DOCUMENTS

| | | | |
|---|---|---|---|
| 5,903,873 A | 5/1999 | Peterson et al. | 705/4 |
| 6,076,072 A | 6/2000 | Libman | 705/34 |
| 6,119,093 A * | 9/2000 | Walker et al. | 705/4 |
| 6,272,528 B1 | 8/2001 | Cullen et al. | 709/222 |
| 6,938,006 B2 * | 8/2005 | Ikeda | 705/27 |
| 2001/0023404 A1 | 9/2001 | Ogawa et al. | 705/4 |
| 2002/0002475 A1 * | 1/2002 | Freedman et al. | 705/4 |
| 2002/0007289 A1 * | 1/2002 | Malin et al. | 705/4 |
| 2002/0010598 A1 | 1/2002 | Johnson et al. | 705/4 |
| 2002/0026334 A1 | 2/2002 | Igoe | 705/4 |
| 2002/0032615 A1 * | 3/2002 | Ikeda | 705/26 |
| 2002/0046063 A1 | 4/2002 | Fujio | 705/4 |
| 2002/0046064 A1 | 4/2002 | Maury et al. | 705/4 |
| 2002/0077866 A1 * | 6/2002 | Javerlhac | 705/4 |
| 2002/0111835 A1 * | 8/2002 | Hele et al. | 705/4 |
| 2003/0004759 A1 * | 1/2003 | Chapman et al. | 705/4 |
| 2003/0135396 A1 * | 7/2003 | Javerlhac | 705/4 |

OTHER PUBLICATIONS

Anonymous, information available at the web site of amexinsurance, Mar. 9, 2000, 3 pages.*
www.insuremarket.com.*
www.amexinsurance.com.*
www.progressive.com.*
www.archive.org/legal/faq.php; frequently asked questions, "How can I tell when the pages from the wayback machine were archived?" on p. 4 of 6.*

* cited by examiner

SYSTEM AND METHOD OF DISPENSING INSURANCE THROUGH A COMPUTER NETWORK

CROSS REFERENCE TO RELATED APPLICATIONS

This application claims priority to and the benefit of, U.S. Provisional Patent Application Ser. No. 60/262,534, filed Jan. 18, 2001 and entitled "Coveragemaker." This application hereby incorporates by reference this prior application in its entirety.

FIELD OF THE INVENTION

This invention relates generally to systems and methods for dispensing insurance services through a computer network.

BACKGROUND OF THE INVENTION

In service-oriented industries such as the insurance industry, offices traditionally were staffed with sales personnel working on a one-to-one basis with walk-in or phone-in customers. Often personnel time would be inefficient since advice and quotations given do not result in a sale. The potential customer might have been under sales pressure, and had to visit or call various companies in order to obtain competing coverages and prices. Thus, time and energy would be wasted for both the industry and the customer, increasing the cost of receiving such services and thereby reducing their demand.

Some individual insurance companies have more recently had sites on the Internet where they provide information or quotes regarding their products. Such websites may be advertised in various ways, including through registering with popular search engines. However, it may be necessary for a potential customer to go to the websites of several insurance companies in order to get competing quotes, typically spending considerable time inputting the same data at each website.

A need exists for potential purchasers of insurance to be able to go to one location or website, input information, and receive quotes for insurance from a plurality of competing insurance companies. In addition, a need exists for insurance companies offering competitive products to be able to advertise and communicate more efficiently and effectively with customers looking for their products and services. Further, a need exists for insurance brokers or agents to be able to more efficiently sell a variety of insurance products from a plurality of insurance companies.

SUMMARY OF THE INVENTION

The present invention provides, inter alia, systems and methods for automatically dispensing information, services and products to customers or their insurance agents, which may be carried out by the customer in a self-service fashion. Such systems and methods may be used, for example, for automatically dispensing insurance quotations and policies. Thus, embodiments of the present invention include systems and methods of distributing insurance that minimize or replace the antiquated and costly gathering of information by telephone or in person, and dispensing of forms and documents by hand, via Telecopier, Fax, or regular mail.

Accordingly, it is a feature of various embodiments of the present invention to provide an automatic and efficient system and method for dispensing information and contractual services to the general public on a self-service basis by accessing the system from the Internet. It is a further feature of various embodiments of the invention to provide such a system which is particularly useful for dispensing information, goods and services such as insurance quotations and policy binder agreements. It is also a feature of various embodiments of this invention to provide the general public with information about comparable insurance coverages from several sources for comparison purposes and in some embodiments to automatically generate and issue insurance binder agreements or insurance policies according to a customer's choices or specifications. An additional feature of various embodiments of this invention is to provide such services by means of a network request from an automated "agent" for the orderly collection of essential information. It is yet another feature of various embodiments of the invention to provide a system which reduces the overall cost of such services by lowering the personnel and office expenses and overheads.

Systems and methods in accordance with the present invention may change and automate many office functions, and may benefit many of the people and entities involved in the industry by reducing paperwork, safely storing and automatically backing up valuable documents, and by reducing workload. Documents may be updated with substantially realtime processing resulting in accurate reporting without waiting for commonly-used, end-of-day processing. In addition, the network may be linked to many computers worldwide, such as the Internet. In some embodiments, virtually any person at any location in the world may be able use the system and method as long as Internet access is available.

The system and method of this invention may allow a potential customer or customer quick and easy access to insurance quotations from more than one company simultaneously, and may allow the customer to select, purchase and receive their documents on a self-service and substantially real-time basis. The operations of gathering information, processing their credit card payment, and issuing policies, may be carried out in substantially real time and automatically. This may result in considerable savings in time and money for the customer and insurance companies alike, and may potentially result in more sales since the number of Internet-connected computers far exceeds what would normally be serviced using current practice by insurance offices and representatives. From the insurance industry's perspective, it may be that many members of the public may be more willing to purchase insurance when they can obtain their policy so easily and quickly, without any sales pressure. In addition, insurance companies may have significant savings on overhead costs.

In addition, this system and method may be applied to many other types of customer service and sales industries. Some examples may be banking, title companies, and financial service companies, and other service industries.

In an exemplary embodiment, the present invention provides a network-based system for facilitating the dispensing of insurance. The system generally receives policy information (for instance, insurance rates and underwriting guidelines, which may be received via the network) from a plurality of insurance companies, and may also contract (e.g., through the network) with insurance companies to sell the companies' insurance policies in accordance with the policy information provided by them. The system may receive customer data (for instance, identification of the desired type of insurance and parameters applicable to the underwriting guidelines) via the network from one or more customers, and provide to each customer (e.g., via the network) insurance rates for insurance policies from a plurality of competing insurance companies. The insurance company may be identified for each insurance rate quotation. The system may also: receive from the customer (e.g., via the network) an instruction to purchase an insurance policy; receive a payment or a promise to pay; and facilitate the electronic distribution of proof of coverage to the location of the customer (e.g., printing at the location of the customer, a document providing proof of coverage).

In some embodiments, the system may be further configured to receive the customer data and an instruction to purchase that were input by an insurance broker or agent (herein insurance agent) on behalf of the customer, receive the payment or promise to pay via the insurance agent, and facilitate printing via a printer controlled by the insurance agent (for the insurance agent to give to the customer). The type of insurance offered for sale may be, for example, automobile or specialty insurance, and may provide coverage exclusively in a specific country (which may be other than the one in which the customer resides). The system may further be configured to store the policy information and customer data, and provide customer service (e.g., notifying customers of changes in the policy information), and may even provide claims service.

The network may be, for example, the Internet. In such embodiments, the system may be configured to receive customer data and instructions to purchase that were input directly by the customer into a computer accessed directly by the customer. Similarly, the system may be configured to receive the payment or promise to pay via the Internet, and/or facilitate printing directly by the customer via a printer accessed by the customer. In some embodiments, the system may be configured to receive customers from insurance agents who perform advertising (for instance, registering with one or more search engines). The system may be further configured to pay the insurance companies the rates of insurance policies issued minus commissions, and pay the insurance agents their appropriate commissions.

The present invention further provides an Internet-based method of facilitating the dispensing of insurance, which may include, in any order, at least the steps of: storing policy information; contracting with insurance agents; receiving customer data, providing insurance rates; receiving an instruction to purchase an insurance policy; receiving a payment; storing at least part of the customer data; and facilitating the electronic distribution of proof of coverage to the location of the customer. This may involve, for instance, directing customers to a website. For instance, the insurance agents may have websites that may be registered with search engines, and customers may be received via links from the insurance agents' websites. The method may further include paying the insurance agents for customers that purchased insurance received via their links. Non-agents' websites may also refer customers, and the method may include paying the non-agents. There may be competing insurance companies, and the method may include reporting to the insurance companies an accounting of the insurance policies that have been issued and the appropriate customer data, and paying the insurance companies premiums for the insurance policies that have been issued. Such methods may be performed by, for instance, a general agent or an insurance company.

The present invention even further provides another Internet-based method of facilitating the dispensing of insurance. This method generally includes in combination, and in any order, at least the steps of: offering quotes through an Internet website on insurance policies from a plurality of insurance companies, and offering quotes through the Internet website on insurance policies through a plurality of insurance agents. The insurance agents may, for example, log into the website. The method generally also includes the steps of: offering quotes through the Internet website on insurance policies directly to members of the public who log into the website, and offering quotes through the Internet website to members of the public through links on insurance agents' websites. The quotes may be offered to customers, at least some of whom may be at different locations. Some customers may accept at least one of the quotes and agree to purchase an insurance policy. In addition, in some embodiments, the method further includes the step of facilitating the electronic distribution of proof of coverage to the locations of the customers who agree to purchase insurance policies.

The present invention still further provides, in another exemplary embodiment, a method of an insurance company selling insurance policies. The method may include (in any order) the steps of providing policy information to a managing general agent, and authorizing the general agent to sell the insurance company's insurance. The general agent may be, for instance, a separate company, part of the insurance company, or another insurance company. The general agent will generally receive data (e.g., via the Internet) from customers, provide to the customer insurance rates (for insurance, for policies from a plurality of competing companies which may be identified for each insurance rate), and receive from the customer an instruction to purchase an insurance policy. The general agent may also receive payment (or a promise to pay) and facilitate the electronic distribution of proof of coverage to the location of the customer (e.g., printing a document). The method will generally also include the steps of receiving from the general agent: an accounting of the insurance policies that have been issued, at least part of the customer data, and payment for the insurance policies that have been issued.

The general agent may contract with a plurality of insurance agents who may advertise the general agent's services. The general agent may have a website configured to receive the customer data, provide the rates, receive customer instructions to purchase, and facilitate the electronic distribution of proof of coverage. The insurance agents may refer customers to the website and the general agent may pay the insurance agents commissions and the insurance company for the insurance policies sold. The customers may also be referred to the website from non-agents; and the general agent may pay the non-agents for referrals as well. The method may also include the steps of verifying the customer data received and/or adjusting claims submitted by the customers. In other respects, various methods in accordance with the present invention may be similar to the system described above, and vice versa.

DETAILED DESCRIPTION OF EXEMPLARY EMBODIMENTS

According to various embodiments of the present invention, an automatic system and method for dispensing valuable documents (such as binder agreements for insurance policies) may be provided. The system may comprise, as an example, a server and computers connected via a network such as the Internet. The network may be linked to information sources of one or more of various companies containing information, for instance, to calculate premiums and to issue official documents. The computers may provide self-service sales to end users (consumers, such as potential customers or policyholders, collectively herein called customers) or sales through other real insurance agents. Embodiments having an insurance agent, may have a system of affiliate identification, a way to process payments, and a printing device or printer to furnish the customer with a permanent record of the issuance of valuable documents such as a document providing proof of (insurance) coverage or an insurance binder.

In this general embodiment of the present invention, the server may automatically store detailed information regarding services and pricing, as well as regarding customer sales completed by each carrier (e.g., insurance company) and sub-producer (e.g., insurance agent). The server may be programmed to offer each carrier and sub-producer, constantly or frequently updated information on sales and commissions due for each carrier and sub-producer. The server may also be programmed to receive information on any changes in rates or services, and may automatically update the information stored accordingly. The server may further be programmed to offer a predetermined sequence of gathering and providing information from/to a customer on the services in which the customer may be interested, and of transmitting the gathered information to the server. In response to the receipt of gathered information, the server may extract the information requested to be provided by the customer from storage and transmit it back via the network where it may be relayed to the customer. In some embodiments, the server can subsequently accept an instruction to purchase for the offered services from the customer, collect the payment from the customer, and dispense official documents (e.g., proof of coverage) to the customer. The server may then automatically update in substantially real time the information stored (for example, in a database) regarding sales, commissions due for each carrier and sub-producer, master agent direct sales, and backup timing.

The figures include flow charts illustrating various steps of various embodiments of the present invention. Embodiments of methods in accordance with the present invention may contain, inter alia, steps from one or more of these drawing figures. As examples of various steps that may be performed, queries from a customer may be accepted by the server, the server may solicit any necessary information or customer data from the customer, and data may be exchanged with the server. In addition, relevant data (e.g., customer data) may be retrieved from one or more data sources, processed, and transmitted to the terminal, and if the customer elects to make a credit card or debit card purchase of goods or services in response to the information received, a credit check may be requested from a credit information source. Further, on credit approval, the requested goods or services (e.g., an insurance policy) may be dispensed (or a document providing proof thereof) in consideration for customer's payment by credit card or other form of payment, and information on the transaction may be transmitted to the relevant company's (e.g., insurance company) data source. In other words, the server may be suitably and securely interfaced to a credit card payment gateway for accepting payments from a customer in response to an instruction to purchase. Such a system and method can, for example, be used in the insurance industry.

The system and method may also store and verify account numbers for the carriers and sub-producers through utilization of which they may allow or restrict authorization to deliver information and/or make any changes in prices or services. There may be, as an example, four levels in which authorization may be given. The first level may be standard web-to-web sales, the second level may be insurance agent sales without the ability to do any editing, the third level may be insurance agent sales with editing capability at the time of the sale and the fourth level may be the master of the universe that can void or edit any aspect of the system at any time.

Figure 1:
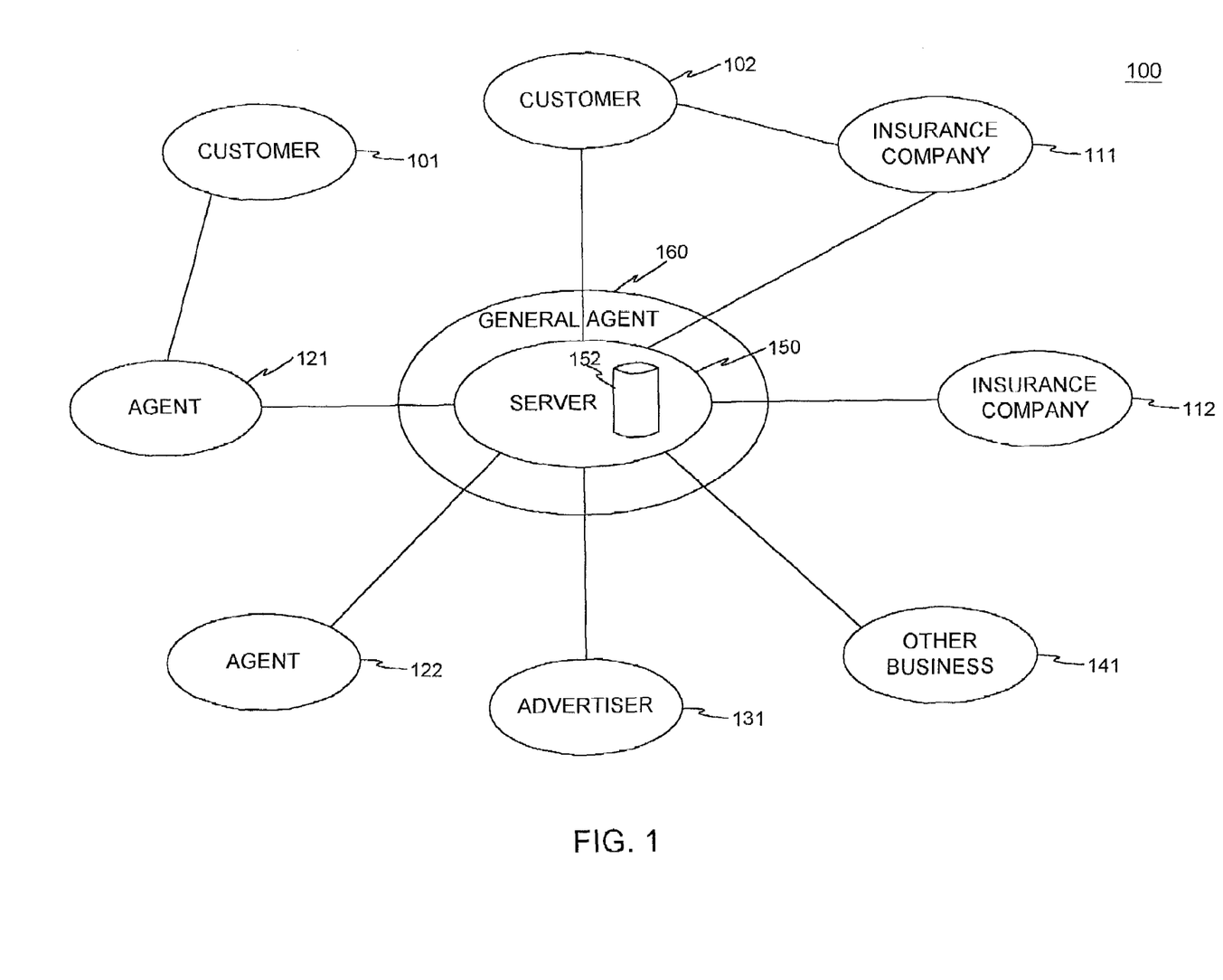
FIG. 1 is a block diagram illustrating an example of a system in accordance with the present invention.

Accordingly, FIG. 1 is a block diagram illustrating an exemplary system 100 in accordance with the present invention that relates specifically to providing or dispensing insurance services or insurance. System 100 may be, for example, a network-based system for facilitating the dispensing or sale of insurance. System 100 may consist of general agent 160, which may include, control, or use, server 150. General agent 160 (e.g., via server 150) may be in communication (either directly or through someone else) with some combination of insurance companies (e.g., 111 and 112), insurance agents (e.g., 121 and 122), customers (e.g., customers 101 and 102), advertisers (e.g., advertiser 131) and other businesses (e.g., business 141) which may refer customers to general agent 160. Server 150 may be programmed to gather and process the required information by way of scripted functions which may have been customized as may be necessary to facilitate the dispensing of official documents from the various companies. As used herein, a customer (e.g., 101 or 102) may include a person, business, organization, entity, software, hardware, or the like who is, has been, or may be interested in purchasing insurance. Customers 101 and 102 may be, for instance, policyholders or potential customers (e.g., interested in purchasing insurance). As used herein, an insurance company (e.g., 111 or 112) may include an insurance underwriter or insurer (e.g., a company or business enterprise that sells insurance or assumes the risks of others, e.g, in exchange for payment). System 100 may be managed by a general agent 160 as described herein. General agent 160 may control or operate all or part of server 150.

Communication may be (in whole or in part) via a network, which may be, for example, the Internet, a local area network (LAN) or a wide area network (WAN). Communication with customers (e.g., 101) may be through insurance agents (e.g., 121 as shown in FIG. 1) or directly (e.g., be directly through the network, e.g., as shown in FIG. 1 for customer 102). Communication through insurance agents (e.g., 121 as shown in FIG. 1) may be, for example, through in-person contact with the insurance agent, by telephone, or by e-mail. Customers (e.g., customer 102) may contact the insurance companies (e.g., 111) directly, through an insurance agent, or through the present invention (e.g., server 150) for the making and adjustment of claims. Advertiser 131 may include various Internet advertisers or other traditional sources of advertisement (e.g., in the entertainment or information industry). Other businesses 141 may include, for example, dealers for equipment (e.g., cars or recreational vehicles) that may be insured, travel agents, and the like, but generally will not include licensed insurance agents. Insurance agents (e.g., 121 and 122) may be licensed insurance agents who may have offices where they sell insurance and/or may have websites that offer insurance for sale. In some embodiments, agents (e.g., 121 and 122) may be unlicensed insurance distributors.

Embodiments of the present invention (e.g., server 150) may gather and categorize information, for example, from typical Internet-connected computers or terminals. As those skilled in the art will appreciate, a user's (e.g., a customer 102 or an insurance agent 121 acting on behalf of a customer 101) computer will typically include various conventional support software and drivers typically associated with computers. The users (e.g., customers 102 or insurance agent 121) may interact with server 150 or other aspects of system 100 via any input device such as a keyboard, mouse, kiosk, personal digital assistant, handheld computer (e.g., Palm Pilot®), cellular phone and/or the like. Similarly, the invention could be used (e.g., server 150 could be accessed) in conjunction with any type of personal computer, network computer, workstation, minicomputer, mainframe, or the like running any operating system such as any version of Windows, Windows NT, Windows2000, Windows 98, Windows 95, 95/98/2000, MacOS, OS/2, BeOS, Linux, UNIX, Solaris, ArcSoft (GIS) or the like.

Server 150 of system 100 may include a host server or other computing system, including, as examples: a processor for processing digital data; a memory (e.g., containing database 152) coupled to the processor for storing digital data; an input digitizer coupled to the processor for inputting digital data; an application program stored in the memory and accessible by the processor for directing the processing of digital data by the processor; a display coupled to the processor and memory for displaying information derived from digital data processed by the processor; and one or more databases (e.g., 152), which may include input data, historical data, specification data and/or like data and information that could be used in association with the present invention.

The software elements of the present invention, for instance used in conjunction with server 150, may be implemented with one or more of various types of computer software or programs. For instance, a programming or scripting language may be used such as C, C++, Java, COBOL, assembler, PERL, extensible markup language (XML), with the various algorithms being implemented with any combination of data structures, objects, processes, routines or other programming elements. Further, it should be noted that the present invention may employ (e.g., in the network) any number of conventional techniques for data transmission, signaling, data processing, network control, and the like. Still further, the invention could detect or prevent security issues with a client-side scripting language, such as JavaScript, VBScript or the like.

Database 152 (e.g., used with server 150) may be of a variety of types, such as relational, hierarchical, object-oriented, and/or the like. Common database products that may be used to implement database 152 include DB2 by IBM (White Plains, N.Y.), any of the database products available from Oracle Corporation (Redwood Shores, Calif.), Microsoft Access by Microsoft Corporation (Redmond, Wash.), or another database product. Database 152 may be organized in a suitable manner, including as data tables or lookup tables. Association of certain data may be accomplished through a data association technique such as those known and practiced in the art.

Turning to how the various equipment associated with the present invention may be configured to interact in various embodiments of the present invention, the system and method of the present invention, as described herein, may carry out various steps. In this regard, the present invention may be described herein in terms of functional block components and various processing steps. It should be appreciated that such functional blocks may be realized by any number of hardware, firmware, and/or software components configured to perform the specified functions, including those components described above. It should also be understood that the exemplary processes illustrated may include more or less steps or may be performed in the context of a larger processing scheme. Furthermore, the various flow-charts presented in the drawing figures are not to be construed as limiting the order in which the individual process steps may be performed.

Accordingly, an exemplary embodiment of the present invention may be directed to a system and method for automatically dispensing insurance quotations, policies, proof of insurance, or other valuable documents such as stock certificates. Still referring occasionally to FIG. 1, but also introducing FIG. 2, general agent 160 (e.g., via server 150) generally receives policy information (step 202), for instance, insurance rates and underwriting guidelines, which may be received via the network from a plurality of insurance companies (e.g., 111 and 112). Underwriting guidelines may include, as examples, in the case of automobile insurance, vehicle type, the age of the driver, the driver's driving record, and any other parameters or factors which insurance companies (e.g., 111 and 112) may use to determine the rates they charge to various customers (e.g., 101 and 102). The policy information (e.g., received in step 202) may be programmed into server 150, for instance, in database 152, or a link may be provided to a remote server or other data storage device. The insurance companies (e.g., 111 and 112) may have access to update the policy information, for instance as rates change.

Figure 2:
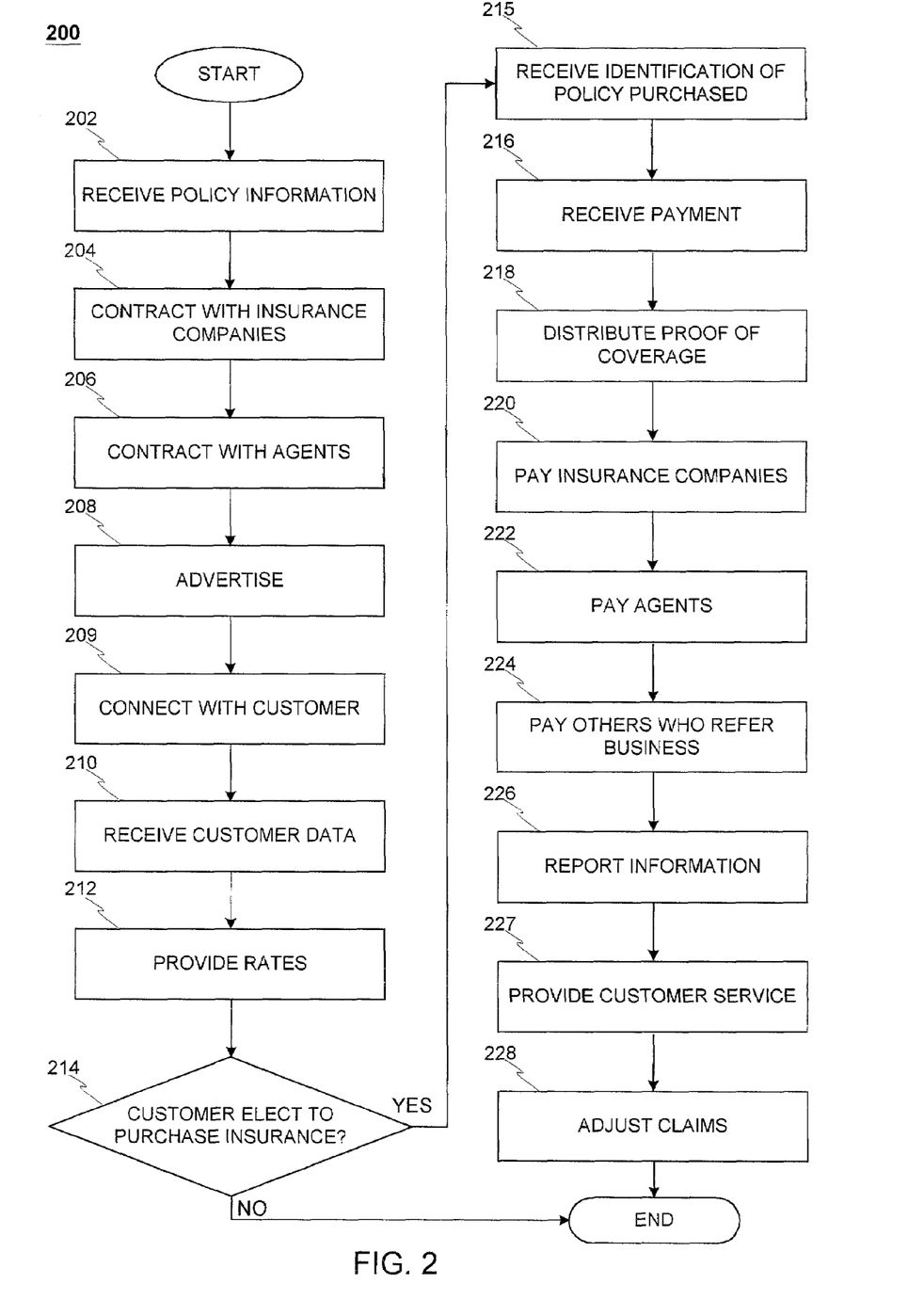
FIG. 2 is a flow chart illustrating the steps of an exemplary method in accordance with the present invention.

General agent 160 (described in more detail below) may also contract (e.g., through the network) with insurance companies (e.g., 111 and 112) (step 204) to sell the companies' (e.g., 111 and 112) insurance policies in accordance with the policy information (obtained in step 202). The contract (of step 204) may be, for instance, a written contract, an agreement entered into via a network (e.g., the Internet), an understanding based on established business practices, performance in accordance with an open-ended offer, a partnership, a joint business venture, forming a corporation together, and the like. General agent 160 (e.g., via server 150) may also receive customer information or data (step 210), for instance, identification of the desired type of insurance (type of insurance the customer, e.g., 101 or 102, is interested in purchasing, for instance, automobile insurance, specialty insurance, home owner's insurance, Mexican insurance, and the like) and various parameters applicable to the underwriting guidelines (i.e., parameters which influence the rates or whether insurance may be issued (received in step 202)). In other words, the parameters applicable to the underwriter guidelines include information that may be needed or desirable to apply the underwriter guidelines to determine whether the customer qualifies for insurance and what rates to charge. A customer (e.g., 101 or 102) may be asked pertinent questions, for instance, regarding the value of the property to be insured, the insurance desired, and any other information necessary or desirable to process a quotation for that particular type of insurance.

The gathered data (customer data) may be sent to the server (e.g., 150) where the data may be processed and interpreted. The customer may be asked first for basic information or data, which may be used (e.g., by server 150) to determine what additional, more-detailed information (customer data) is requested and obtained. Various fields on particular pages on a web site may be required to be satisfied (e.g., by customer 102) before proceeding to the next page or step. The customer data (e.g., received in step 210) may be stored, for instance, in database 152.

The customer data may be received (step 210) via the network from one or more customers. For instance, the data may be received (step 210) from customer 101, who may have used insurance agent 121, who may have actually input the data. On the other hand, the data may have been input by customer 101 after being referred to general agent 160 by insurance agent 121. As another option, the information may be received from customer 102, who may have directly input the information without using a separate insurance agent. Various embodiments may feature various combinations of these options.

General agent 160 (e.g., via server 150) may further provide (in step 212), for instance, to each customer (e.g., 101 or 102, which may also be via the network) quotes for insurance policies or insurance rates for insurance policies from a one or more (e.g., a plurality of) competing insurance companies (e.g., companies 111 and/or 112). The insurance company (e.g., 111 or 112), offering the policy may be identified for each insurance rate (e.g., in step 212) so that the customer will be aware of the source of the insurance and may apply any knowledge or opinions he may have regarding the company, for instance regarding claims service, which may be from the customer's past experience, the reputation of the insurance company, a industry or governmental entity which tracks the performance of or rates insurance companies, or advertising by the insurance company or others. The insurance company offering each policy may be identified, for instance, by showing the name of the insurance company, its initials, or its logo, next to the rate. In some embodiments, the insurance company offering each policy may be identified for some (e.g., a plurality of) policies, but rates for other policies may also be provided without identifying the insurance company (e.g., to appeal to customers who may have a low opinion of the insurance company or may wish to purchase insurance without considering the reputation of the company).

An exemplary embodiment of the present invention includes in combination, and in any order, at least the steps of: offering quotes (step 212) for instance through an Internet website on insurance policies from one or more insurance companies (e.g., 111 and 112), and offering quotes (step 212) (which may also be through the Internet website) on insurance policies, through a plurality of insurance agents (e.g., 121). The insurance agents (e.g., 121) may, for example, log into the website (e.g., via server 150). The method generally also includes the steps of: offering quotes (step 212) on insurance policies directly to members of the public (e.g., customer 102) who log into the website, and offering quotes (step 212) to members of the public (e.g., customer 101) through links on insurance agents' (e.g., 121) websites. The quotes (e.g., provided in step 212) may be offered to customers (e.g., 101 and 102), at least some of whom may be at different physical locations, which may be many miles apart. Some customers (e.g., 101 or 102) may accept at least one of the quotes (provided in step 212) and agree to purchase an insurance policy (step 214 and/or 215). In addition, in some embodiments, the method further includes facilitating the electronic distribution of proof of coverage (step 218) to the locations of the customers (e.g., 101 or 102) who agree to purchase insurance policies.

General agent 160 (e.g., via server 150) may then (after providing the rate in step 212) receive (e.g., in step 214) from the customer (e.g., 101 or 102) an instruction (one or more instructions) to purchase an insurance policy, if the customer (e.g., 101 or 102) elects to do so (in step 214). General agent 160 (e.g., via server 150) may also receive from customer (e.g., 101 or 102) an indication of which insurance policy the customer chooses to purchase (step 215).

General agent 160 (e.g., via server 150) may also receive a payment or a promise to pay (step 216, which may include a credit check or verification, which may be via a network), and facilitate the electronic distribution of proof of coverage to the location of the customer (e.g., in step 218, e.g., customer 101 or 102). In an exemplary embodiment, a document providing proof of coverage may be printed, and electronic distribution may include providing access to a web page to print, sending an e-mail or e-mail attachment, sending a facsimile, and the like. The proof of coverage may be, as examples, an electronic copy of the insurance policy or a summary thereof that may be stored on a portable electronic device, a hard (paper) copy of the insurance policy, a binder, a proof-of-insurance card, or the like. For instance, general agent 160 (e.g, via server 150) may transmit digital data or instructions to print a document (step 218) providing proof of coverage (insurance coverage) at the printer of the customer, or make available a screen which when printed provides proof of coverage. Electronic distribution of proof of coverage may include providing information or data that may be stored electronically (e.g., on a personal digital assistant (PDA), smart card, or the like). Thus, customers 101 or 102 may be able to bind insurance coverage virtually immediately. The proof of coverage may show, as examples, a combination of: the dates of coverage, the name and logo of the insurance company (e.g., 111 or 112), the type of coverage, the person or persons covered, a policy number, where the insurance is applicable, the amount paid, coverage limits, and the like.

Thus, in an exemplary embodiment of the present invention, after being provided the rates (step 212) the customer (e.g., 101 or 102) may be given an opportunity to immediately select (steps 214 and 215) an insurance policy, and purchase it (steps 216 and 218) from one of the institutions (e.g., insurance companies 111 or 112), and download or print it or proof of purchasing it (step 218) at the customer's location. For instance, if an insurance policy binder is desired (e.g., to be printed in step 218), payment may be processed (step 216) and a policy or document proving possession thereof (e.g., a document providing proof of coverage) may be printed (step 218) on the customer's printer attached to the customer's computer. A prospective insurance purchaser (e.g., customer 101 or 102) may quickly receive a plurality of quotes (step 212) from various institutions at virtually any time, in many embodiments without having to submit information to a real person or be subjected to an in-person sales presentation.

In some embodiments, general agent 160 (e.g., via server 150) may be further configured to receive the customer data (step 210) and instructions (one instruction or more) to purchase (steps 214 and 215) that were input or input by an insurance agent (e.g., 121) on behalf of the customer (e.g., 101). This information may be input, for instance, at the insurance agent's (e.g., 121) office, and the customer (e.g., 101) may be present at the insurance agent's office, (e.g., 121) or in contact with him, e.g., via phone or e-mail. In such embodiments (or others), a contract may be entered (step 206) with the insurance agent (e.g., 121) to sell the insurance. General agent 160 may receive (step 216) the payment (e.g., cash or money order) or promise to pay (e.g., via credit card) via the insurance agent (e.g., 121), and facilitate printing (step 218) via a printer controlled by the same insurance agent (e.g., for the insurance agent 121 to give to the customer 101). In other words, the insurance agent (e.g., 121) may take the payment or promise to pay (e.g., cash, check, or charge) from the customer (e.g., 101), and may send payment (e.g., minus a commission) to general agent 160. General agent 160 (e.g., via server 150) may calculate the amount of net premium (e.g., gross premium paid to the insurance agent less commission), which may be due, e.g., monthly. General agent 160 (e.g., via server 150) may bill the insurance agent (e.g., 121) or may subtract what the insurance agent (e.g., 121) owes general agent 160 from what general agent 160 owes the insurance agent (e.g., 121). In other embodiments, the insurance agent (e.g., 121) may send payment directly to the insurance companies (e.g., 111 and/or 112), who may pay general agent 160.

The insurance of various embodiments of the present invention may be, for example, automobile or specialty insurance, or may provide coverage exclusively in a country other than the one in which the customer (e.g., 101 or 102) resides. Specialty insurance, as used herein, includes specialty consumer insurance or personal lines of insurance, as the terms are used in the insurance industry, and includes, as examples, insurance for recreational vehicles (RV's) including motor homes and trailers, boats, motorcycles, all-terrain vehicles (ATV's), sand rails, off-road vehicles (ORV's), jet skis, and the like.

In various embodiments of the present invention, the network (e.g., described above) may be, for example, the Internet. In such embodiments, general agent 160 (e.g., via server 150) may be configured to receive data (step 210) and instructions to purchase (steps 214 and 215) that were input or input directly by the customer (e.g., 102 into a computer accessed directly by customer 102). Similarly, the general agent 160 (e.g, via server 150) may be configured to receive the payment or promise to pay (step 216) via the Internet, and/or facilitate the electronic distribution of proof of coverage (step 218) to the location of the customer (e.g., 102). For instance, a document providing proof of coverage may be printed directly by the customer via a printer accessed by the customer (e.g., 102). In various embodiments of the present invention, time may be saved by automatically qualifying the buyer (e.g., customer 101 or 102). If the customer (101 or 102) elects to purchase (e.g., an insurance policy), a secure, encrypted web page may be made to appear where the customer's (101 or 102) credit card information may be gathered, the network or server 150 may initiate a credit check and, on approval, dispense the electronic or paper document (step 218) (e.g., an insurance policy or proof of coverage).

In some embodiments, the general agent 160 (e.g., via server 150) may be configured to receive customers (e.g., 101) from insurance agents (e.g., 121) who perform advertising (step 208). For instance, insurance agents (e.g., 121) may have their own web page (or a plurality of web pages) and may register with one or more search engines or may have rights to one or more domain names that may be reached frequently by customers (e.g., 101). The insurance agents' (e.g., 121) web page may have various meta tags configured so that the insurance agents' web pages are identified by the search engines when customers (e.g., 102) search for insurance companies (e.g., 111 or 112) with the search engines. Once a customer (e.g., 101) reach the insurance agent's (e.g., 121) website, the customer (e.g., 101) may be sent, for instance via a link, to general agent's 160 website (e.g., via server 150) where general agent 160 (e.g., via server 150) may connect with the customer (step 209) through the website, identify which insurance agent referred the customer for purposes of paying commissions, receive customer data (step 210), etc.

General agent 160 (e.g., via server 150) may be further configured to pay (step 220) the insurance companies (e.g., 111 and 112) the insurance premiums (e.g., the rates of insurance policies issued minus commissions), and pay (step 222) the insurance agents (e.g., 121 and 122) their appropriate commissions. The insurance agents (e.g., 121 or 122) may be paid, for instance, commissions on sales of insurance, which may be a percentage of the premium. Commissions may be paid or sent out each month (e.g., checks by regular mail or electronic payments into designated accounts).

General agent 160 (e.g., via server 150) may also pay others who refer business (step 224), such as businesses who sell the products that are being insured, travel agents, and other entities other than insurance agents (non-agents). For instance, a boat dealer may have on his website a link to general agent 160 (e.g., via server 150) which may provide boat insurance, or a travel agent who provides travel services to Mexico may have a link on his website to general agent 160 (e.g., via server 150) which may provide Mexican automobile insurance. Payments for such referrals (paid in step 224 e.g., to non-agents) may be based on the number of referrals rather than on the premiums collected or policies sold, and may also be paid, periodically (e.g., monthly).

General agent 160 (e.g., via server 150) may also store (for instance, in database 152) the policy information and customer data (e.g., received in steps 202 and 210, e.g., through server 150), and may report (step 226) information and data to the insurance companies (e.g., 111 and 112) provide customer service (step 227) and may even provide claims service (step 228). Customer service (provided in step 227) may include, for instance, sending renewal notices, billing customers, notifying customers of changes in the policy information (e.g., rates or coverage), providing notices of hazards, and the like.

Thus, general agent 160 may service the product for the insurance companies (e.g., 111 and 112). The information that is reported (step 226) may include some or all of the customer data (obtained in step 210), information regarding payment (e.g., received in step 216), other information from previous transactions, and the like. To obtain the information, the insurance company (e.g., 111 or 112), as an example, may obtain a report from a website at a time selected by the insurance company (e.g., 111 or 112), or may receive a report (e.g., an e-mail from server 150), which may be sent by general agent 160 or server 150 at particular times (e.g., daily or monthly). Customers (e.g, 101 and 102) and insurance agents (e.g., 121 and 122) may be sent or obtain (step 226) reports similarly. The information reported (e.g., in step 226), and other information and data (e.g., used in steps 218, 220, 222, 224, 227, or 228) may be stored in, or retrieved from, for instance, database 152.

Accordingly, various embodiments of system 100 and method 200 as applied to the insurance industry may offer personalized insurance quotations (step 212), make sales or take orders (e.g., steps 214 and 215), collect the premiums (step 216), and may make pertinent information available (step 226) to the respective insurance company (e.g., 111 or 112) on a substantially real-time basis. The respective insurance company (e.g., 111 or 112) may have reduced paperwork, less overhead costs, and access to accurate information substantially in real time (e.g., via step 226). The various reports (e.g., from step 226) may allow each company, carrier and sub-producer to view data in system 100 as necessary or desirable. A quotation analysis report may give listings by carrier and/or sub-producer, service type; by company, by date; or based on other data being gathered. Thus service companies (e.g., insurance companies 111 or 112) may be able to analyze the areas where more quotes are being requested. The rates may be updated by adding the rate files for each type of service offered by each company.

Figure 3:
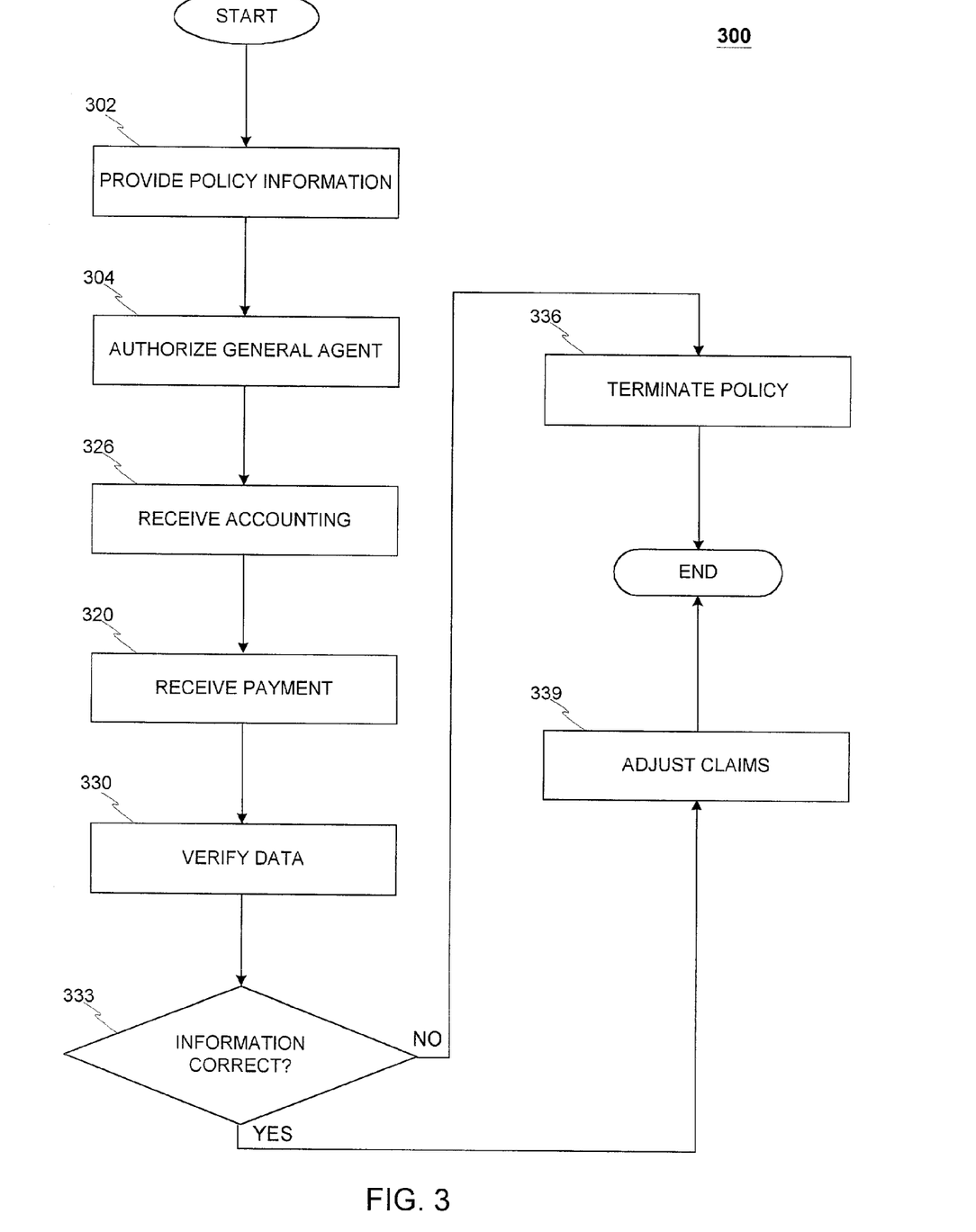
FIG. 3 is another flow chart illustrating the steps of another exemplary method in accordance with the present invention.

Referring to FIG. 3, the present invention further provides a method 300 of an insurance company (e.g., 111 or 112) marketing or selling insurance policies. Method 300 may include (in any order) the steps of providing policy information (step 302) to a managing general agent 160 (e.g., via server 150), and authorizing (step 304) general agent 160 (e.g., via server 150) to market or sell the insurance company's (e.g., company 111 or 112) insurance. Information and data manipulated in method 300, may be stored in database 152, which may be at server 150. Although referred to herein as being a separate entity, the role of general agent 160 may be performed by an insurance company.

Referring back for a moment to FIG. 2, and also to FIG. 1, general agent 160 (e.g., via server 150) will generally receive customer data (step 210, e.g., via the Internet) from customers (e.g, 101 or 102), provide to the customer (e.g., 101 or 102) insurance rates (step 212, for insurance, for policies from a plurality of competing companies, e.g, 111 and 112, which may be identified for each insurance rate), and receive from the customer (e.g., 101 or 102) instructions to purchase an insurance policy (e.g., in steps 214 and/or 215). One or more of these steps may be though an insurance agent (e.g., 121), for instance, as described herein. General agent 160 (e.g., via server 150) may also receive payment (or a promise to pay, e.g., in step 216) and facilitate the electronic distribution of proof of coverage (e.g., step 218, which may be to the location of the customer 101 or 102). Method 300 will generally also include the steps of receiving from general agent 160 (e.g., from server 150) an accounting (step 326) of the insurance policies that have been issued (e.g., which may be as reported in step 226, and generally including at least part of the customer data received in step 210) and payment (step 320, as paid in step 220) generally for the insurance policies that have been issued.

General agent 160 may contract (e.g., through server 150) with one or a plurality of insurance agents (e.g., 121 and 122) who may perform advertising (e.g., step 208). General agent 160 may have a website (e.g., on server 150) configured to receive the customer data (step 210), provide the rates (step 212), receive the instructions to purchase (e.g., for steps 214 and/or 215), and facilitate the electronic distribution of proof of coverage (step 218). The insurance agents (e.g., 121) may refer customers (e.g., 101) to the website and general agent 160 may pay the insurance agents' (e.g., 212) commissions (step 222) and the insurance companies' (e.g., 111 or 112) premiums (step 220) for the insurance policies sold Thus, general agent 160 may effectively manage the insurance companies' (e.g., 111 and 112) transactions with its insurance agents (e.g., 121 and 122).

The customers (e.g., 101 or 102) may also be referred to the website from non-agents (e.g., advertiser's 131 or other businesses 141, non-agents generally being anyone who is not a licensed insurance agent and whose main business is other than selling insurance); and general agent 160 may pay the non-agents (e.g., in step 224) for referrals as well. Method 300 may also include the steps of verifying the customer data (step 330) and/or adjusting claims (step 339) submitted by the customers (e.g., 101 or 102). Verifying the customer data (step 330) may include, as examples, obtaining information from, or providing information to, various levels of government or other entities (e.g., verifying the license and registration of a vehicle, verifying the customer's driving record, appraising the value of property, checking claims history, and the like). In some embodiments, step 330 may be performed via the Internet, and in some situations may be automatically performed (e.g., by server 150). If the customer data is found to be inconsistent in a relevant way with what was known or believed at the time the policy was issued (e.g., in step 333), for example, the rates may be adjusted or the policy terminated or cancelled (step 336), in accordance with applicable laws and regulations.

Adjusting claims (step 228 or 339) may include providing a forum for policyholders (customers who have purchased insurance, e.g., customers 101 or 102) to input claims information (e.g., as prompted or as text) which may be provided to real claims adjusters who may further investigate or verify the claims information. Once the process is complete, a settlement offer or payment may be made, which may be via server 150. Performing step 228 or 339 via server 150 may allow the policyholder to input information quickly and easily, and may save time for the real adjuster obtaining claims information and paying claims. In addition, claims information may be stored via database 152 for future use or reporting.

In many other respects, the methods 200 and 300 may be similar to the system 100 described above, and vice versa.

Modifications may be made to the disclosed embodiments without departing from the scope of the invention. The scope of the invention is therefore not limited to the disclosed embodiments but is defined by the appended claims. In other words, other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the elements of at least one of the claims below, or the equivalents thereof, are included.

What is claimed is:

1. A network-based method for facilitating the dispensing of insurance providing coverage in a country other than the country in which the customer resides comprising in any order at least the steps of:

receiving policy information, at a host, from a plurality of insurance companies, the policy information including at least one of insurance rates and underwriting guidelines;

contracting, by the host, with an agent to sell, via an agent website, insurance policies from the plurality of insurance companies in accordance with the policy information;

receiving, at the host, customer data from at least one of the agent website and an agent representative via the network, the data including at least identification of the desired type of insurance and parameters applicable to the underwriting guidelines;

obtaining, at the host, calculations of insurance rates for insurance policies from a plurality of competing insurance companies;

providing, by the host to the customer via the network, the insurance rates for the insurance policies from at least a portion of the plurality of competing insurance companies, the insurance policies providing coverage in a country other than the country in which the customer resides;

receiving, by the host, a selection from the customer of at least one insurance policy from the provided insurance rates and insurance policies, wherein the plurality of competing insurance companies are required to bind coverage and provide the at least one insurance policy to the customer upon selection;

receiving, at the host from the customer via the network, instructions to purchase the selected insurance policy providing coverage in a country other than the country in which the customer resides, along with customer financial transaction account information to facilitate payment;

facilitating, by the host, authorization of the customer financial transaction account information without involvement by the agent or the plurality of insurance companies; and creating and distributing, by the host, the electronic proof of the bound coverage to the location of the customer.

2. The method according to claim 1 wherein:

the network is the Internet;

the data is input directly by the customer into a computer accessed by the customer;

the instructions to purchase the insurance policy are input directly by the customer into a computer accessed by the customer;

the payment or promise to pay is received via the Internet and input directly by the customer into a computer accessed by the customer; and the electronic distribution includes printing at the location of the customer, via a printer accessed by the customer, a document providing proof of coverage.

3. The method according to claim 1 wherein the country in which the customer resides is the United States, and the country other than the country in which the customer resides is Mexico.

4. The method according to claim 3 further comprising the steps of:

paying the insurance companies premiums; and paying the insurance agents commissions.

5. The method according to claim 1 further comprising analyzing underwriting rules.

6. The method according to claim 1 further comprising underwriting the insurance policy.

7. The method according to claim 1 wherein the insurance policy is an auto insurance policy.

8. The method according to claim 7, the method further comprising the steps of:

storing the policy information;

storing the data; and providing customer service, the customer service including at least notifying customers of changes in the policy information.

9. The method according to claim 8 further comprising the step of providing claims service.

10. The method according to claim 1:

the insurance being selected from the group consisting of automobile insurance and specialty insurance; and the insurance providing coverage in Mexico.

11. The method according to claim 1:

the data being input into a computer by an insurance agent on behalf of the customer;

the instructions to purchase being input by the insurance agent on behalf of the customer;

the payment or promise to pay being received from the customer by the insurance agent;

the electronic distribution including printing at the location of the customer, a document providing proof of coverage;

the printing being via a printer controlled by the insurance agent; and the method further comprising the step of the insurance agent giving the document to the customer.

12. The method according to claim 1, the insurance being automobile insurance.

13. The method according to claim 1, the insurance being specialty insurance.

14. The method according to claim 1, the insurance providing coverage exclusively in a country other than the one in which the customer resides.

15. The method of claim 1, further comprising providing authorization levels based upon account numbers associated with the plurality of insurance companies, such that the authorization levels provide the agent with various levels of at least one of access and editing capabilities.

16. The method of claim 1, wherein the step of facilitating the electronic creation and distribution of proof of coverage to the location of the customer further comprises providing proof of coverage with at least one of scripted functions and customized information based on requirements from one of the plurality of insurance companies.

17. The method of claim 1, wherein the step of providing the insurance rates further comprises providing the insurance rates which include opinions or extra knowledge from the agent related to the insurance companies associated with the insurance rates.

18. The method of claim 1, wherein the step of providing the insurance rates further comprises providing the insurance rates without identifying the related insurance company providing the insurance rate.

19. The method of claim 1, wherein the step of providing the insurance rates further comprises providing a quotation analysis report which lists statistics related to the quotes requested.

20. The method of claim 1, further comprising receiving claims information from policyholders which is automatically transmitted to claims adjusters for processing.

21. An Internet-based method of facilitating the dispensing of insurance, the method comprising in any order at least the steps of:

storing policy information for insurance policies at a host, the policy information including at least one of insurance rates and underwriting guidelines, the insurance policies providing coverage in a country other than the country in which the customer resides, wherein the insurance companies providing the insurance policies are required to bind coverage and provide the insurance policies based on the insurance rates provided to the customer when the insurance policy is selected by the customer;

contracting, by the host, with a plurality of insurance agents for facilitating the dispensing of the insurance policies via the agents respective websites using advertising;

receiving customer data at the host via the Internet from at least one of the agent website and an agent representative, the data including at least one of identification of the desired type of insurance and parameters applicable to the underwriting guidelines;

obtaining, at the host, calculations of insurance rates from a plurality of competing insurance companies;

providing, from the host via the Internet, the insurance rates for at least a portion of the insurance policies;

receiving, by the host, a selection from the customer of at least one insurance policy from the provided insurance rates and insurance policies;

receiving, at the host via the Internet, an instruction from the customer to purchase said selected insurance policy from the provided insurance rates and insurance policies, along with customer financial transaction account information to facilitate payment;

storing, at the host, at least part of the customer data; and creating and distributing, by the host, electronic proof of the bound coverage to the location of the customer.

22. The method according to claim 21 further comprising directing the customer to a website.

23. The method according to claim 22:

the insurance agents having websites;

the advertising comprising registering with at least one search engine; and the method further comprising the steps of:
receiving customers via links from the insurance agents' websites;
paying the insurance agents, at least for customers that purchased insurance received via the links.

24. The method according to claim 21, the method further comprising the steps of:
receiving customers via links from non-agents' websites; and
paying the non-agents.

25. The method according to claim 21, the insurance policies being specialty insurance.

26. The method according to claim 21, the policy information being from a plurality of competing insurance companies.

27. The method according to claim 21:

the insurance rates being from the plurality of competing insurance companies; and the method further comprising the step of:
reporting to at least one of the insurance companies an accounting of at least some of the insurance policies that have been issued and at least part of the data,
paying at least one of the insurance companies premiums for at least some of the insurance policies that have been issued.

28. The method according to claim 21, the insurance policy providing coverage in Mexico.

29. A method for selling insurance policies from competing insurance companies, the method comprising in any order at least the steps of:

providing policy information to a managing general agent, the policy information including at least one of insurance rates and underwriting guidelines;

authorizing the managing general agent to sell, via a website associated with the managing general agent, a plurality of insurance policies in accordance with the policy information, the insurance policies providing coverage in a country other than the country in which the customer resides, wherein the competing insurance companies are required to bind coverage and provide the insurance policies based on the provided insurance rates to the customer when the insurance policy is selected by the customer, the managing general agent website performing the following steps:
receiving customer data via the Internet from a customer, the data including identification of the desired type of insurance and parameters applicable to the underwriting guidelines,
sending the customer data to a host website to calculate insurance rates and receive the insurance rates,
providing to the customer via the Internet, insurance rates for insurance policies from at least a portion of the competing insurance companies, the competing companies being identified for each insurance rate,
receiving from the customer via the Internet, and sending to the host website a selection from the customer of at least one insurance policy from the provided insurance rates and insurance policies, and,
receiving from the customer via the Internet, and sending to the host website, an instruction to purchase said selected insurance policy, along with customer financial transaction account information to facilitate payment, receiving from the host website, authorization of the customer financial transaction account information without involvement by the managing general agent or the insurance companies; and creating and distributing electronic proof of the bound coverage to the location of the customer;

receiving from the managing general agent an accounting of the insurance policies that have been issued and at least part of the data; and receiving payment for the insurance policies that have been issued from the managing general agent.

30. The method according to claim 29:

the general agent further being configured to contract with a plurality of insurance agents; and the insurance agents performing advertising.

31. The method according to claim 30:

the general agent having at least one website;

the website being configured to at least:
receive the data,
provide the rates,
receive the instruction to purchase, and
facilitate the electronic distribution of the proof of coverage;

the advertising including registering with at least one search engine;

the insurance agents referring customers to the website;

the general agent paying the insurance agents commissions;

the general agent paying the insurance company for insurance policies sold.

32. The method according to claim 31:

customers further being referred to the website from non-agents; and the general agent paying the non-agents for referrals.

33. The method according to claim 29, the insurance being automobile insurance.

34. The method according to claim 29, the insurance being specialty insurance.

35. The method according to claim 29, the insurance providing coverage exclusively in a country other than the one in which the customer resides.

36. The method according to claim 29 further comprising the step of verifying that the data is correct.

37. The method according to claim 29 further comprising the step of adjusting a plurality of claims.

* * * * *